United States Patent [19]

Wize

[11] 4,138,142
[45] Feb. 6, 1979

[54] PASSIVE LAP AND SHOULDER BELT SYSTEM

[75] Inventor: Gary A. Wize, Washington, Mich.

[73] Assignee: General Motors Corporation, Detroit, Mich.

[21] Appl. No.: 864,551

[22] Filed: Dec. 27, 1977

[51] Int. Cl.$^2$ .............................................. B60R 21/10
[52] U.S. Cl. .................................................. 280/745
[58] Field of Search ................ 280/745, 747; 297/388, 297/389

[56] References Cited

U.S. PATENT DOCUMENTS

| | | | |
|---|---|---|---|
| 3,680,883 | 8/1972 | Keppel et al. | 280/745 |
| 3,770,078 | 11/1973 | Keppel et al. | 280/745 |
| 3,815,934 | 6/1974 | Weststrate | 280/745 |
| 3,827,714 | 8/1974 | Lefeuvre | 280/745 |
| 3,827,717 | 8/1974 | Sakurai | 280/745 |
| 3,882,955 | 5/1975 | Kaneka | 280/745 |
| 3,933,369 | 1/1976 | Kaneka | 280/745 |

*Primary Examiner*—Robert R. Song
*Attorney, Agent, or Firm*—Charles E. Leahy

[57] ABSTRACT

A passive three-point lap and shoulder belt system has the inboard ends of the lap and shoulder belts mounted on the vehicle body generally adjacent the hip of the occupant by an emergency release buckle. Lap and shoulder belt retractors are mounted on the door generally adjacent the hip of the occupant for winding the belts thereon upon closing movement of the door and unwinding the belts therefrom upon opening movement of the door. An anchor loop is mounted on the door generally adjacent the shoulder of the occupant and slidably receives the shoulder belt to dispose the shoulder belt diagonally across the chest of the occupant when the door is closed and forwardly of the occupant when the door is open. A guide loop is attached to the shoulder belt at a point thereon which travels between the retractor and the anchor loop during movement of the door between open and closed positions. The guide loop slidably receives the lap belt to lift the lap belt from the retractor and vertically along the door toward the anchor loop during opening movement of the door so that the lap belt assumes a stowed occupant access position generally parallel with the shoulder belt to facilitate occupant ingress and egress. Closing of the door winds the shoulder belt and lowers the lap belt to the restraining position across the lap of the occupant.

4 Claims, 3 Drawing Figures

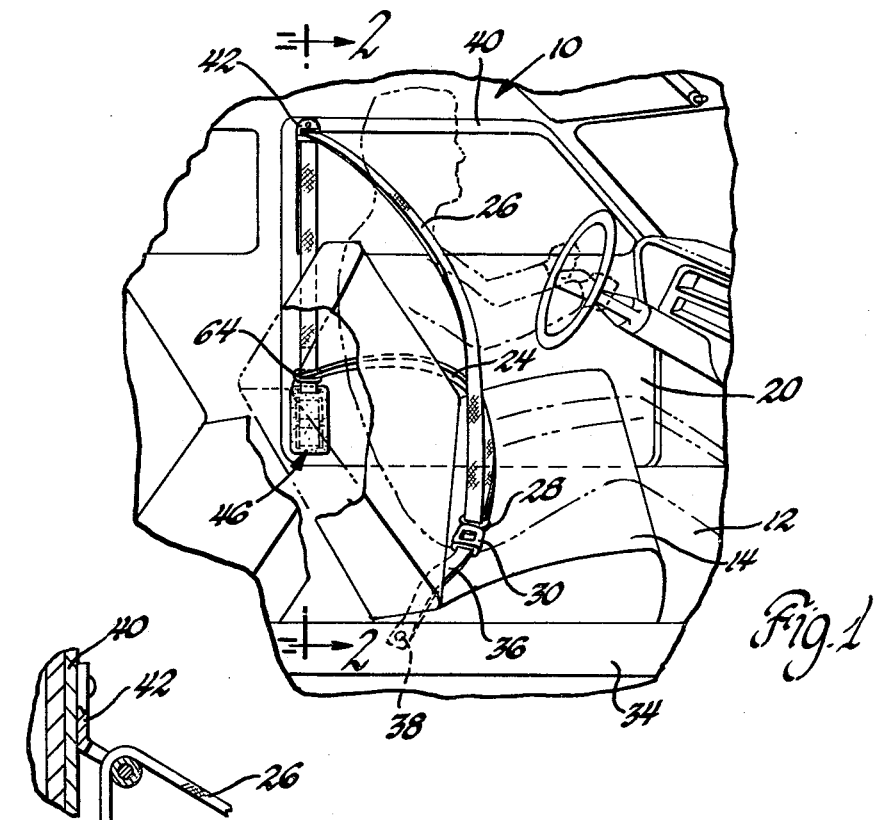
Fig. 1
Fig. 3
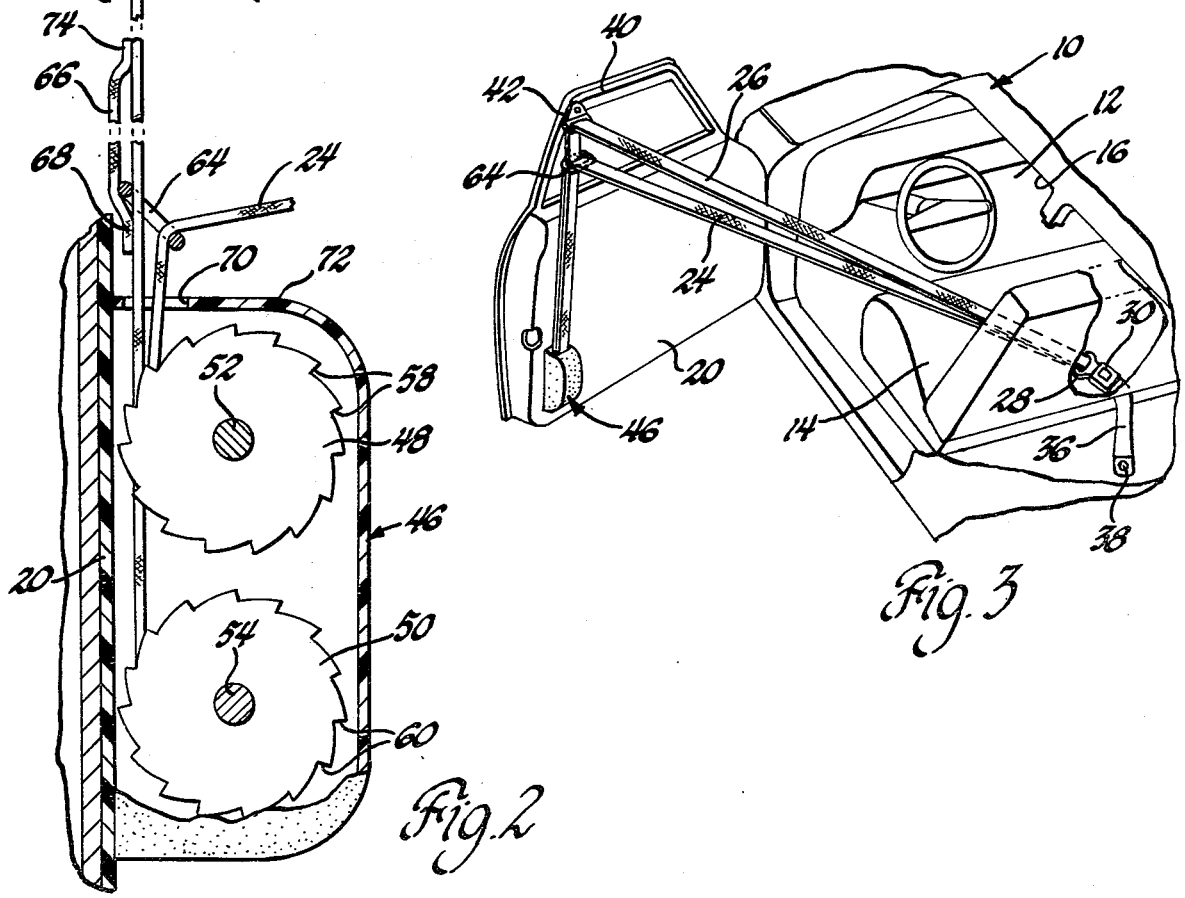
Fig. 2

PASSIVE LAP AND SHOULDER BELT SYSTEM

The invention relates to a passive occupant restraining lap and shoulder belt system.

It is well known in motor vehicles to restrain an occupant in the seat by a lap belt disposed across the lap and a shoulder belt disposed diagonally across the chest. It is also known to connect the outboard belt ends to the door so that the belt is automatically moved between a restraining position about the occupant and a stowed position forwardly of the seat in response to movement of the door between open and closed positions. It is common in such passive belt systems to connect the outboard end of the lap belt to the door generally adjacent the hip of the occupant. However, it has been found that this low position of the belt obstructs occupant ingress and egress.

Accordingly, it has been recognized as desirable to move the outboard lap belt end forwardly and/or upwardly upon opening of the door to facilitate occupant ingress or egress. U.S. patent Keppel et al. U.S. Pat. No. 3,680,883, issued Aug. 1, 1972, and assigned to the assignee of this invention, provides a track on the door having a guide loop traveling therein to move the outboard lap belt end forwardly and upwardly upon opening of the door. Other prior art devices such as U.S. patents Westrate et al. U.S. Pat. No. 3,815,934, issued June 11, 1974 and Keppel et al. U.S. Pat. No. 3,770,078, issued Nov. 6, 1973, and assigned to the assignee of this invention, provide a reel driven by a motor or a door responsive drive mechanism which winds a cord attached to the lap belt to pull the lap belt forwardly and upwardly upon opening movement of the door.

The present invention provides a new and improved lap and shoulder belt system wherein unwinding of the shoulder belt upon opening of the door lifts the lap belt to stowed occupant access position generally parallel with the shoulder belt.

According to the present invention a passive three-point lap and shoulder belt system has the inboard ends of the lap and shoulder belts mounted on the vehicle body generally adjacent the hip of the occupant by an emergency release buckle. Lap and shoulder belt retractors are mounted on the door generally adjacent the hip of the occupant for winding the belts thereon upon closing movement of the door and unwinding the belts therefrom upon opening movement of the door. An anchor loop is mounted on the door generally adjacent the shoulder of the occupant and slidably receives the shoulder belt to dispose the shoulder belt diagonally across the chest of the occupant when the door is closed and forwardly of the occupant when the door is open. A guide loop is attached to the shoulder belt at a point thereon which travels between the retractor and the anchor loop during movement of the door between open and closed positions. The guide loop slidably receives the lap belt to lift the lap belt from the retractor and vertically along the door toward the anchor loop during opening movement of the door so that the lap belt assumes a stowed occupant access position generally parallel with the shoulder belt to facilitate occupant ingress and egress. Closing of the door winds the shoulder belt and lowers the lap belt to the restraining position across the lap of the occupant.

The object, feature and advantage of the invention resides in the provision of a door mounted passive three-point lap and shoulder belt system wherein the unwinding of the shoulder belt from a retractor adjacent the hip of the occupant and toward a door mounted shoulder height anchor loop in response to opening movement of the door lifts the lap belt along the door from the lap of the occupant to a stowed occupant access position generally parallel with the shoulder belt.

This and other objects, features and advantages of the invention will become apparent upon consideration of the specification and the appended drawings in which:

FIG. 1 is a perspective view of a motor vehicle occupant compartment having a belt arrangement according to the invention with the lap and shoulder belts shown in occupant restraining positions with respect to a phantom-line indicated seated occupant;

FIG. 2 is a sectional view taken in the direction of arrows 2—2 of FIG. 1; and

FIG. 3 is a perspective view of the vehicle with the door shown in the open position moving the lap and shoulder belts to their stowed occupant access positions.

Referring to FIG. 1, the vehicle body generally indicated at 10 defines a passenger compartment 12 in which an occupant seat 14 is provided for seating a phantom-line indicated occupant. The vehicle body has a door opening 16 which is selectively closed by a door 20 which has its forward end pivoted to the vehicle body.

As seen in FIG. 1, the occupant is restrained in a seated position by a belt arrangement which includes a lap belt 24 and a shoulder belt 26. The inboard ends of lap belt 24 and shoulder belt 26 are joined at a latch plate 28. An emergency release buckle 30 mates with the latch plate 28 and is attached to the drive line tunnel 34 of the vehicle body by a short length of belt 36 and an anchor bolt 38.

As best seen in FIG. 1, the outboard end of lap belt 24 is connected to the door 20 at a position generally adjacent the hip of the occupant to position the lap belt in an occupant restraining position when the door 20 is closed. The outboard end of the shoulder belt 26 is slidably mounted on the window frame 40 of the door 20 by an anchor loop 42 so that the shoulder belt 26 is disposed over the shoulder and across the chest of the occupant when the door 20 is closed.

Referring to FIG. 2, it is seen that a retractor assembly generally indicated at 46 is attached to the door generally adjacent the hip of the occupant and includes a lap belt reel 48 to which the end of the lap belt 24 is attached and a shoulder belt reel 50 to which the end of shoulder belt 26 is attached. The reels 48 and 50 are respectively rotatable on reel shafts 52 and 54 and have associated winding springs, not shown, which rotate the reels in the counterclockwise direction to wind the lap and shoulder belts thereon. Ratchet teeth 58 and 60 are provided respectively on the reels 48 and 50 for engagement by a conventional latching mechanism, not shown, to lock the reels against belt unwinding rotation. The latching mechanism may be of the inertia actuated type such as United States patent Griffin U.S. Pat. No. 3,831,878, issued Aug. 22, 1974 and incorporated herein by reference. The latching mechanism may also be connected to the door handle as in U.S. patent Keppel et al. U.S. Pat. No. 3,770,078, issued Nov. 6, 1973 or Arlauskas et al. U.S. Pat. No. 3,692,328, issued Sept. 19, 1972 and incorporated herein by reference. Other suitable prior art retractor locking mechanisms may also be used.

As best seen in FIG. 2, the lap belt 24 is connected to the shoulder belt 26 by a guide loop 64 having a central aperture which slidably receives the lap belt 24 and which is attached to the shoulder belt 26 by a short length of strap 66 sewn to the shoulder belt. As seen by comparing FIGS. 1 and 3, the strap 66 attaches the guide loop 64 to the shoulder belt 26 at a point on the shoulder belt which travels vertically between the retractor assembly 46 and the anchor loop 42 during winding and unwinding of the shoulder belt 26 from the reel 50 in response to movement of the door 20 between the open and closed positions. Upon movement of the door 20 from the closed position of FIG. 1 to the open position of FIG. 3, the lap belt 24 is unwound from reel 48 and shoulder belt 26 is unwound from reel 50. During opening movement of the door, the guide loop 64 is lifted vertically along the door from adjacent the retractor assembly 46 to adjacent the anchor loop 42 so that the outboard portion of the lap belt 24 assumes a position generally parallel with the position of the shoulder belt 26 when the door reaches the full open position of FIG. 3. During such vertical movement the lap belt 24 slides through the guide loop 64 to permit movement of the lap belt relative the shoulder belt and thereby accommodate an extent of lap belt unwinding which may differ from the extent of shoulder belt unwinding.

It will be understood that the position of the strap 66 connecting the guide loop 64 to the shoulder belt 26 determines how close the lap belt 24 approaches a parallel condition with the shoulder belt. It may be desirable to have the belts gapped somewhat from one another as seen in FIG. 3 so that even though the door is full open a still further unwinding of the lap and shoulder belts may be obtained as the occupant pushes the belts forwardly somewhat in order to further facilitate his entry or exit. Furthermore, the provision of the space between the lap and shoulder belts permits the occupant to reach between the belts to grasp the door handle to pull the door closed so that the shoulder belt will be positioned above the occupant's arm and the lap belt will be positioned below the occupant's arm. On the other hand, it may be desirable to have the belts more closely parallel when the door is open to provide an aesthetically pleasing system by minimizing the visual presence of the belt system.

As the door is pulled closed from its open position of FIG. 3, the shoulder belt and lap belt are wound by their respective reels 48 and 50. The winding of shoulder belt 26 lowers the guide loop 64 along the door from adjacent the anchor loop 42 to adjacent the retractor assembly 46. Accordingly, the lap belt is lowered to the restraining position of FIG. 1 across the lap of the occupant as the lap and shoulder belts are rewound.

Referring to FIGS. 1 and 2, it will be understood that the relative spacing of the retractor assembly 46 and anchor loop 42, the geometry of a particular seat belt system, or the movement of the seat or occupant rearward of the FIG. 1 position may necessitate winding of the shoulder belt 26 beyond the position shown in FIG. 2. Accordingly, the lower end 68 of the strap 66 may pass through an opening 70 of a plastic housing 72 on the retractor assembly 46 while the guide loop 64 rests upon the housing 72. The strap 66 attaching the guide loop to the shoulder belt will accordingly define a strap length sufficient to accommodate the maximum needed extent of shoulder belt winding.

The aperture of anchor loop 42 is of adequate size to allow the upper end 74 of strap 66 to pass therethrough during shoulder belt unwinding upon door opening to lift the guide loop 64 into engagement with the guide loop 42 so that the lap belt 24 is parallel with the shoulder belt 26. It may be advantageous to employ a strap 66 of elastic material so that the shoulder belt 26 may be further unwound after guide loop 64 engages the anchor loop 42 by permitting the strap 66 to stretch and loop about the guide loop 64 after its upper end 74 and its lower end 68 have successively passed through the guide loop 42.

It will be understood that the lap belt reel 48 may be mounted inboard the seat in which case the outboard end of the lap belt may be fixedly attached to the door adjacent the shoulder belt reel. Furthermore, the inboard belt ends may be mounted on the seat.

Thus, it is seen that the invention provides a new and improved passive three-point lap and shoulder belt system wherein the shoulder belt lifts the lap belt vertically along the door to a stowed access position generally adjacent the shoulder belt upon opening movement of the door and lowers the lap belt onto the lap of occupant upon closing of the door.

The embodiments of the invention in which an exclusive property or privilege is claimed are defined as follows:

1. In combination with a vehicle body having an occupant compartment in which an occupant seat is accessible through a door opening selectively opened and closed by a movable door, a passive occupant restraining belt arrangement comprising:

a lap belt and a shoulder belt having inboard ends and outboard ends;

means mounting the inboard ends of the lap belt and shoulder belt on the vehicle body generally adjacent the hip of the occupant;

retractor means mounted on the door adjacent the hip of the occupant and mounting the outboard ends of the lap belt and the shoulder belt for winding the belts thereon upon closing movement of the door and unwinding the belts therefrom upon opening movement of the door;

an anchor loop mounted on the door generally adjacent the shoulder of the occupant and slidably receiving the shoulder belt to dispose the shoulder belt diagonally across the chest of the occupant when the door is closed and dispose the shoulder belt in an occupant access position forwardly of the seat when the door is open;

and connecting means acting between the lap belt and the shoulder belt to move the lap belt along the door toward the anchor loop during opening movement of the door whereby the lap belt assumes an occupant access position generally parallel with the access position of the shoulder belt to facilitate occupant ingress and egress.

2. In combination with a vehicle body defining an occupant compartment in which an occupant seat is accessible through a door opening selectively opened and closed by a movable door, a passive occupant restraining belt arrangement comprising:

a lap belt having a first end mounted on the vehicle body inboard the occupant and a second end mounted on the door generally adjacent the hip of the occupant;

a lap belt retractor mounting one of the lap belt ends for winding the lap belt upon closure of the door and unwinding the lap belt upon opening of the door;

a shoulder belt having a first end mounted on the vehicle body generally adjacent the inboard hip of the occupant and having a second end;

an anchor loop mounted on the door generally adjacent the shoulder of the occupant and slidably receiving the shoulder belt intermediate the first and second ends thereof to dispose the shoulder belt diagonally across the chest of the occupant;

a shoulder belt retractor mounted on the door generally adjacent the hip of the occupant for winding the shoulder belt upon closing movement of the door and unwinding the shoulder belt to an occupant access position with the belt disposed generally forwardly of the occupant when the door is moved to the open position;

and a guide loop attached to the shoulder belt at a point thereon traveling generally vertically between the shoulder belt retractor and the anchor loop during shoulder belt winding and unwinding, said guide loop slidably receiving the lap belt to unwind and lift the lap belt vertically upon opening movement of the door whereby the lap belt assumes an occupant access position generally parallel with the access position of the shoulder belt to facilitate occupant ingress and egress.

3. In combination with a vehicle body defining an occupant compartment in which an occupant seat is accessible through a door opening selectively opened and closed by door whose forward edge is pivoted to the vehicle body, a passive occupant restraining belt arrangement comprising:

a lap belt adapted for disposition across the lap of the occupant for restraint of the lower torso;

a shoulder belt adapted for disposition diagonally across the chest of the occupant for restraint of the upper torso;

means mounting the lap and shoulder belts on the vehicle body inboard and generally adjacent the hip of the seated occupant;

an anchor loop mounted on the door generally adjacent the shoulder of the occupant and slidably receiving the shoulder belt to dispose the shoulder belt diagonally across the chest of the occupant;

an inertia locking shoulder belt retractor mounted on the door generally adjacent the hip of the seated occupant for winding the shoulder belt about the occupant upon closing movement of the door and unwinding the belt to an occupant access position disposed generally forwardly of the occupant when the door is moved to the open position;

an inertia locking lap belt retractor mounted on the door generally adjacent the hip of the occupant for winding the lap belt across the lap of the seated occupant upon closing movement of the door and unwinding the lap belt upon opening movement of the door;

and a guide loop attached to the shoulder belt at a point thereon traveling between the shoulder belt retractor and the anchor loop during shoulder belt unwinding and winding upon opening and closing movement of the door, said guide loop slidably receiving the lap belt to lift the lap belt vertically upon unwinding of the shoulder belt from the shoulder belt retractor induced by door opening movement whereby the lap belt assumes an occupant access position generally parallel with the access position of the shoulder belt to facilitate occupant ingress and egress.

4. In combination with a vehicle body defining an occupant compartment in which an occupant seat is accessible through a door opening selectively opened and closed by door whose forward edge is pivoted to the vehicle body, a passive occupant restraining belt arrangement comprising:

a lap belt adapted for disposition across the lap of the occupant for restraint of the lower torso;

a shoulder belt adapted for disposition diagonally across the chest of the occupant for restraint of the upper torso;

emergency release buckle means mounting the lap and shoulder belts on the vehicle body inboard and generally adjacent the hip of the seated occupant;

an anchor loop mounted on the door generally adjacent the shoulder of the occupant and slidably receiving the shoulder belt to dispose the shoulder belt diagonally across the chest of the occupant;

an inertia locking shoulder belt retractor mounted on the door generally adjacent the hip of the seated occupant for winding the shoulder belt about the occupant upon closing movement of the door and unwinding the belt to an occupant access position disposed generally forwardly of the occupant when the door is moved to the open position;

an inertia locking lap belt retractor mounted on the door generally adjacent the hip of the occupant and above the shoulder belt retractor for winding the lap belt across the lap of the seated occupant upon closing movement of the door and unwinding the lap belt upon opening movement of the door;

and a guide loop attached to the shoulder belt at a point thereon traveling between the shoulder belt retractor and the anchor loop during shoulder belt unwinding and winding upon opening and closing movement of the door, said guide loop slidably receiving the lap belt to lift the lap belt vertically upon unwinding of the shoulder belt from the shoulder belt retractor induced by door opening movement whereby the lap belt assumes an occupant access position generally parallel with the access position of the shoulder belt to facilitate occupant ingress and egress.

* * * * *